United States Patent
Wagener et al.

(10) Patent No.: US 9,680,570 B2
(45) Date of Patent: Jun. 13, 2017

(54) OPTICAL CHANNEL MONITOR FOR A WAVELENGTH SELECTIVE SWITCH EMPLOYING A SINGLE PHOTODIODE

(71) Applicant: NISTICA, INC., Bridgewater, NJ (US)

(72) Inventors: Jefferson L. Wagener, Morristown, NJ (US); Bradford Smith, Ontario (CA)

(73) Assignee: Nistica, Inc., Bridgewater, NJ (US)

( * ) Notice: Subject to any disclaimer, the term of this patent is extended or adjusted under 35 U.S.C. 154(b) by 30 days.

(21) Appl. No.: 14/700,281

(22) Filed: Apr. 30, 2015

(65) Prior Publication Data

US 2016/0323034 A1 Nov. 3, 2016

(51) Int. Cl.
*H04B 10/079* (2013.01)
*H04J 14/02* (2006.01)

(52) U.S. Cl.
CPC .... *H04B 10/07957* (2013.01); *H04J 14/0212* (2013.01)

(58) Field of Classification Search
None
See application file for complete search history.

(56) References Cited

U.S. PATENT DOCUMENTS

| | | | |
|---|---|---|---|
| 6,430,328 B1 | 8/2002 | Culver et al. | |
| 6,956,687 B2 | 10/2005 | Moon et al. | |
| 7,092,599 B2 | 8/2006 | Frisken | |
| 7,123,833 B2 | 10/2006 | Szczepanek et al. | |
| 7,126,740 B2 | 10/2006 | Szczepanek et al. | |
| 7,397,980 B2 | 7/2008 | Frisken | |
| 2010/0046944 A1* | 2/2010 | Wagener | H04J 14/02 398/34 |
| 2012/0201534 A1 | 8/2012 | Miyashita et al. | |
| 2012/0230681 A1 | 9/2012 | Ueki et al. | |
| 2014/0363162 A1 | 12/2014 | Chu et al. | |

FOREIGN PATENT DOCUMENTS

| | | |
|---|---|---|
| JP | 2010-245993 | 10/2010 |
| WO | 2008057347 A2 | 5/2008 |

* cited by examiner

*Primary Examiner* — Darren E Wolf
(74) *Attorney, Agent, or Firm* — Mayer & Williams PC; Stuart H. Mayer

(57) ABSTRACT

A method of monitoring at least one optical wavelength component of a WDM optical signal being routed through a wavelength selective switch (WSS) includes directing an optical wavelength component from a given input port of the WSS to a selected output port with a selected amount of attenuation. A rejected portion of the optical wavelength component giving rise to the selected amount of attenuation is directed to an optical monitor associated with another output port of the WSS. A power level of the optical wavelength component is determined by pre-calibrating a proportionality between the power level of the wavelength component and the power level of the rejected portion that is directed to the optical monitor.

15 Claims, 4 Drawing Sheets

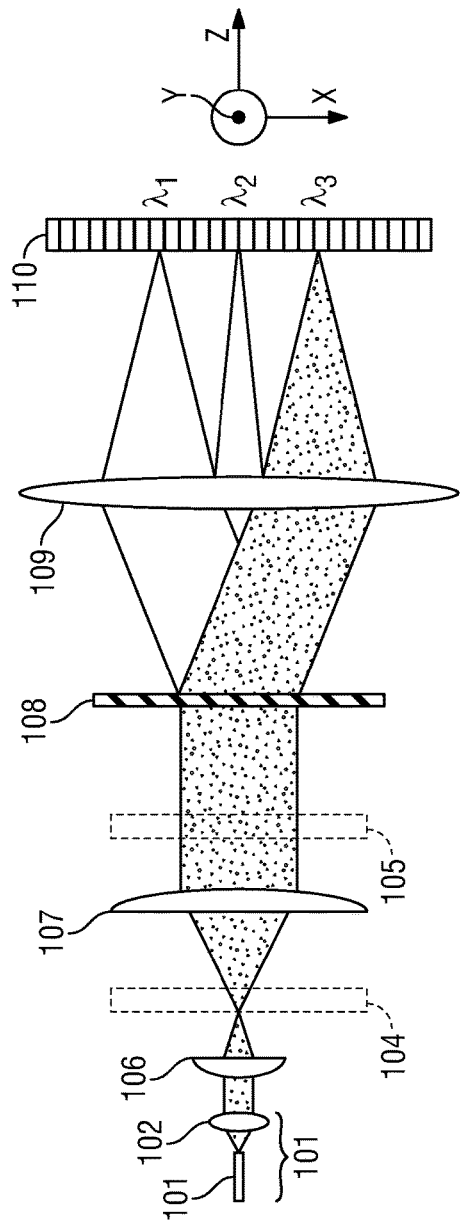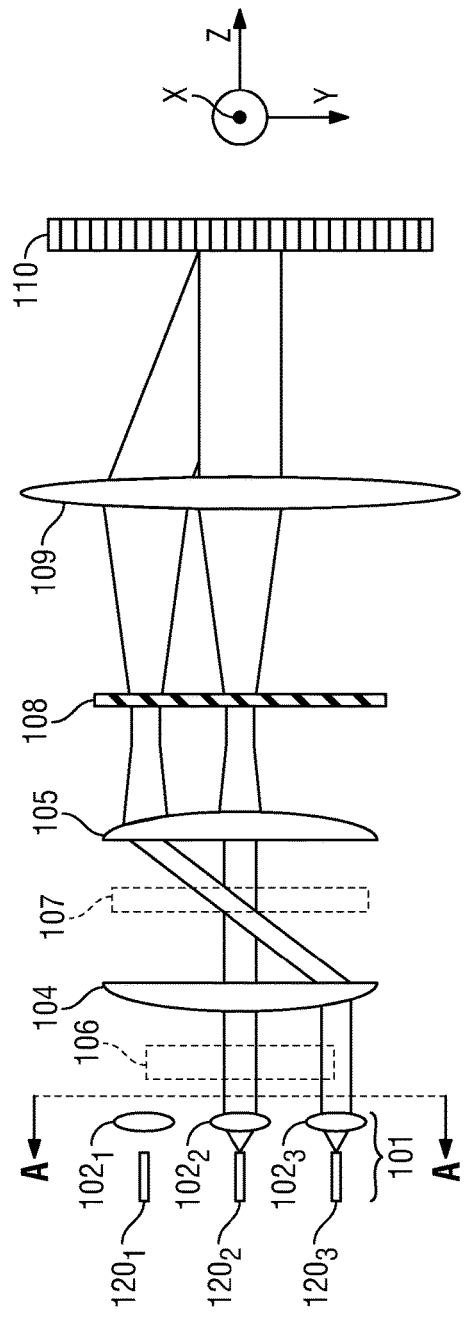
FIG. 4A
FIG. 4B

OPTICAL CHANNEL MONITOR FOR A WAVELENGTH SELECTIVE SWITCH EMPLOYING A SINGLE PHOTODIODE

BACKGROUND

Fiber optic communication systems typically employ wavelength division multiplexing (WDM), which is a technique for using an optical fiber to carry many spectrally separated independent optical channels. In a wavelength domain, the optical channels are centered on separate channel wavelengths which in dense WDM (WDM) systems are typically spaced apart by 25, 50, 100 or 200 GHz. Information content carried by an optical channel is spread over a finite wavelength band, which is typically narrower than the spacing between channels.

Optical channel monitoring is increasingly being used by telecommunications carriers and multi-service operators of fiber optic systems. As the traffic on optical networks increases, monitoring and management of the networks become increasingly important issues. To monitor the network, the spectral characteristics of the composite signal at particular points in the network must be determined and analyzed. This information may then be used to optimize the performance of the network. Optical channel monitoring is particularly important for modern optical networks that use reconfigurable and self-managed fiber-optic networks.

For example, reconfigurable optical add/drop multiplexers (ROADMs) and optical cross connects, which are used to manipulate individual wavelength channels as they are transmitted along the network, require an optical channel monitor. A ROADM allows dynamic and reconfigurable selection of wavelength channels that are to be added or dropped at intermediate nodes along the network. In a ROADM, for instance, an optical channel monitor can provide an inventory of incoming channels as well as an inventory of outgoing channels and to provide channel-power information to variable optical attenuator (VOA) control electronics so that the power of added channels can be equalized with the pass-through channels.

One type of optical channel monitor employs a wavelength selective switch (WSS), which is a type of switch configured to perform optical switching on a per wavelength channel basis, and is typically capable of switching any wavelength channel at an input fiber to any desired output fiber. Thus, a 1XN WSS can switch any wavelength channel of the WDM input signal propagating along the input fiber to any of the N output fibers coupled to the WSS.

U.S. application Ser. No. 14/220,583 shows an OCM that is incorporated in a WSS. A series of photodiodes are provided, each of which receive optical wavelengths from one of the output ports of the OCM.

SUMMARY

In accordance with one aspect of the invention, a method of monitoring at least one optical wavelength component of a WDM optical signal being routed through a wavelength selective switch (WSS) is provided. In accordance with the method, a first phase pattern to be produced by an SLM is selected from among a first plurality of phase patterns. Each of the phase patterns in the first plurality of phase patterns (i) directs a first optical wavelength component from a first input port of the WSS to a selected output port and (ii) causes the first wavelength component to undergo a first selected amount of attenuation. The first phase pattern is further selected to cause a first rejected portion of the first optical wavelength component to give rise to the first selected amount of attenuation to be directed to an optical monitor associated with another output port of the WSS. A first portion of the SLM is periodically programmed with the first phase pattern. The first optical wavelength component is directed to the first portion of the SLM while the first portion of the SLM is periodically configured with the first phase pattern.

In accordance with another aspect of the invention, an optical device is provided with includes an optical port array, a photodetector, a dispersion element, a focusing element, a programmable optical phase modulator and a processor. The optical port array has at least one optical input port for receiving an optical beam and a plurality of optical output ports. The photodetector is optically coupled to a first of the optical output ports. The dispersion element receives the optical beam from the at least one optical input port and spatially separates the optical beam into a plurality of wavelength components. The focusing element focuses the plurality of wavelength components. The programmable optical phase modulator receives the focused plurality of wavelength components. The modulator is configured to steer the wavelength components to a selected one of the optical output ports. The optical device also include a non-transitory computer-readable storage medium comprising instructions that, when executed, control the processor to be configured for programming a first portion of the programmable optical phase modulator with a first phase pattern. The first phase pattern is selected by the processor from among a first plurality of phase patterns that (i) directs a first of the plurality of optical wavelength components from a first of the optical input ports to a selected output port and (ii) causes the first wavelength component to undergo a first selected amount of attenuation. The first phase pattern is further selected to cause a first rejected portion of the first optical wavelength component giving rise to the first selected amount of attenuation to be directed to the first optical output port.

BRIEF DESCRIPTION OF THE DRAWINGS

FIGS. 4A and 4B are top and side views respectively of one example of a simplified optical device such as a free-space switch that may be used in conjunction with embodiments of the present invention.

DETAILED DESCRIPTION

Figure 1:
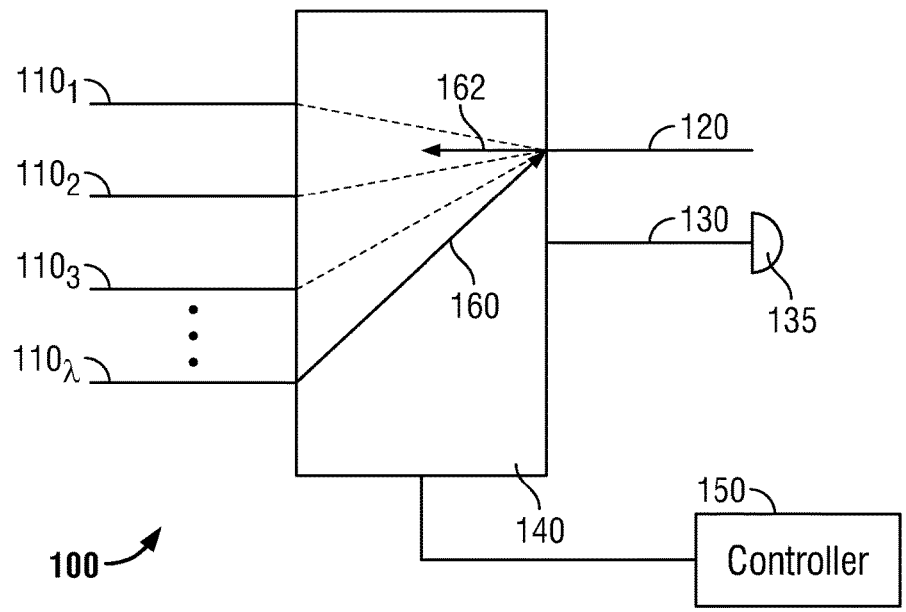
FIG. 1 shows a functional block diagram of one example of a wavelength selective switch (WSS) that includes an integrated channel monitor.

FIG. 1 shows a functional block diagram of one example of a wavelength selective switch (WSS) 100 that includes an integrated channel monitor. For simplicity of illustration the WSS 100 is depicted as an N×2 switch, with N input ports $110_1$, $110_2$, $110_3$, ... $110_n$ ("110") and two output ports 120 and 130. In other implementations the WSS may have more than two output ports.

A switching fabric 140 operates under control of a controller or processor 150 to optically couple the input ports 110 to the output ports 120 and 130 so that the individual wavelength components or channels of a WDM optical signal received at any of the input ports 110 can be selectively directed to either one of the output ports 120 and 130 under the control of a switch controller 150.

As further shown in FIG. 1, output port 130 terminates in a photodetector 135 such as a photodiode. As explained below the photodetector 135 can be used as an optical channel monitor to measure the power levels and possibly other signal quality parameters of an optical beam that is directed from any of the input ports 110 to the output port 120. If more than one output port is provided (in addition to output port 130, which is used for OCM), the photodetector 135 can be used to measure the power levels and possibly other signal quality parameters of an optical beam that is directed from any of the input ports 110 to any of the output ports.

Switching fabric 140 may incorporate a spatial light modulator (SLM) that can serve as an optical path conversion system. A spatial light modulator (SLM) consists of an array of optical elements (pixels) in which each pixel acts independently as an optical "valve" to adjust or modulate light intensity. An optical signal is dispersed onto the array along a spectral axis or direction so that the individual channels in the signal are spread over multiple ones of the optical elements. Each wavelength component or channel, or a group of wavelength components or channels, may be selectively attenuated or blocked by actuating a select number of optical elements so that the portion of the channel incident on those selected optical elements are directed away from a return path.

WSS devices often rely on spatial light modulators such as liquid crystal on silicon (LCoS) devices or micro-electromechanical (MEMS) mirror arrays to perform the routing between the input and output ports. For purposes of illustration only and not as a limitation on the subject matter described herein, a WSS that employs a LCoS device as the spatial light modulator will be described.

LCoS devices include a liquid crystal material sandwiched between a transparent glass layer having a transparent electrode, and a silicon substrate divided into a two-dimensional array of individually addressable pixels. Each pixel is individually drivable by a voltage signal to provide a local phase change to an optical signal, thereby providing a two-dimensional array of phase manipulating regions. Manipulation of individual spectral components is possible once an optical signal has been spatially separated by a diffractive element such as a diffraction grating. The spatial separation of spectral components is directed onto predetermined regions of the LCoS device, which can be independently manipulated by driving the corresponding pixels in a predetermined manner.

A programmable optical phase modulator such as a LCoS device produces a phase shift at a given pixel location in a pixel array which is determined programmatically. Such a modulator can be used in multiple ways, forming virtual lenses, prisms or tilted mirrors among other items. Due to the limited thickness and actuation of a LCoS device, the total phase shift that can be achieved at any given location is limited. This limitation can be circumvented in a LCoS device by application of the segmentation technique similar to that used to form a Fresnel lens by compressing the surface power of a lens into a plano surface. Specifically, the total phase shift desired is usually modulo $2\pi$ at the wavelength of interest. The resultant phase is then always less than $2\pi$. Unfortunately, this segmentation technique introduces scattering of light in directions that an un-segmented pattern would not produce. This scattered light is one reason that crosstalk is naturally higher in an LCoS WSS.

Figure 2:
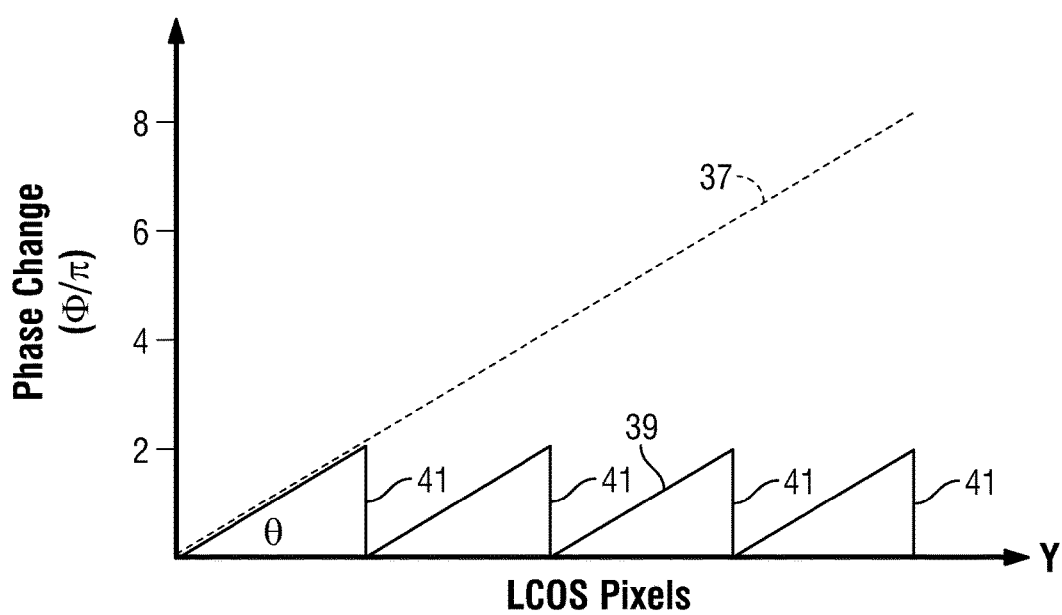
FIG. 2 shows an example of a periodic, stepped phase shift profile that may be produced across a region of a LCoS device in the y-axis.

Turning to FIG. 2, there is illustrated an example of a periodic, stepped phase shift profile 39 that may be produced across a region of a LCoS device 21 in the y-axis. The periodic, stepped phase shift profile 39 produces a cumulative phase profile 37. The cumulative steering profile 37 is produced by driving each pixel 19 with a predetermined voltage to provide a desired phase change. As there is a direct relationship between voltage and phase, and a direct relationship between phase and steering angle, a look-up table or the like can be generated which relates the required voltage drive signal with a desired steering angle. The periodic nature of phase is utilized to reduce the required drive voltage. Therefore a periodic, stepped voltage signal will produce the periodic, stepped phase shift profile 39, which in turn produces the cumulative phase profile 37, where phase resets 41 occur at multiples of $2\pi$ radians. When acting on an incident wavelength component, the phase profile 37 produces a steering angle proportional to or equal to $\theta$. Accordingly, by proper adjustment of the periodic, stepped phase shift profile the wavelength components can be selectively directed to a desired one of the optical fibers.

When directing an optical beam (e.g., an optical wavelength component) from a particular input port to a particular output port, the beam may be attenuated with a desired degree of attenuation by, for example, directing the optical beam so that it does not completely overlap the output port. The desired attenuation can be achieved by appropriate adjustment of the phase pattern applied to the LCoS so that only part of the optical beam is coupled to the output port.

The desired amount of attenuation imparted to the optical beam may be achieved with a wide variety of different phase patterns. Application of different phase patterns to the portion of the LCoS on which the beam is incident will cause the rejected light (i.e. the portion of the optical beam not directed to the selected output port) to be directed in different directions.

Referring again to FIG. 1, the solid line 160 represents an optical beam being directed from the selected input port $110_n$ to the selected output port 120 with a desired amount of optical attenuation. Likewise, the solid lines 162 represent the rejected light that gives rise to the attenuation. The dashed lines shown in FIG. 1 represent undesirable crosstalk which arises from light being directed by the LCoS from other input ports 110 to the desired output port 120. The various phase patterns that direct the optical beam with the same desired amount of attenuation may cause different amounts of crosstalk to arise. Accordingly, it generally will be desirable to a select a phase pattern that reduces this crosstalk to maintain port isolation.

When selecting a suitable phase pattern to be produced by the LCoS or other SLM for directing an optical beam between a selected pair of ports while producing the desired amount of attenuation, the rejected light can be simply lost by directing it away from any of the ports. This is illustrated in FIG. 1 by rejected light 162. Alternatively, a phase pattern to be produced by the LCoS may be selected which directs at least some of the rejected portion of the optical beam to the output 130 equipped with the photodetector 135. The ratio of the rejected portion of the optical beam to the remaining portion of the optical beam that is directed between the selected pair of input and output ports will be the same for a particular LCoS phase pattern. Thus, the amount of light measured by the photodetector 135 is proportional to the amount of light routed to the selected output port. The actual amount of light routed to the selected output port may be determined by proper calibration, which may be accomplished by measuring the optical power of the input beam and the optical power received by both the selected output port and the photodetector for the selected LCoS phase pattern.

Using the above calibration process, the amount of light directed between any selected pair of ports with a desired amounted of attenuation (corresponding to a particular LCoS phase pattern) can be monitored by the photodetector 135. Each wavelength being directed from an input port to an output port with a selected degree attenuation can be sequentially monitored in this manner by selecting an LCoS phase pattern that give rises to the selected degree of attenuation while directing the rejected light to the photodetector 135.

Figure 3:
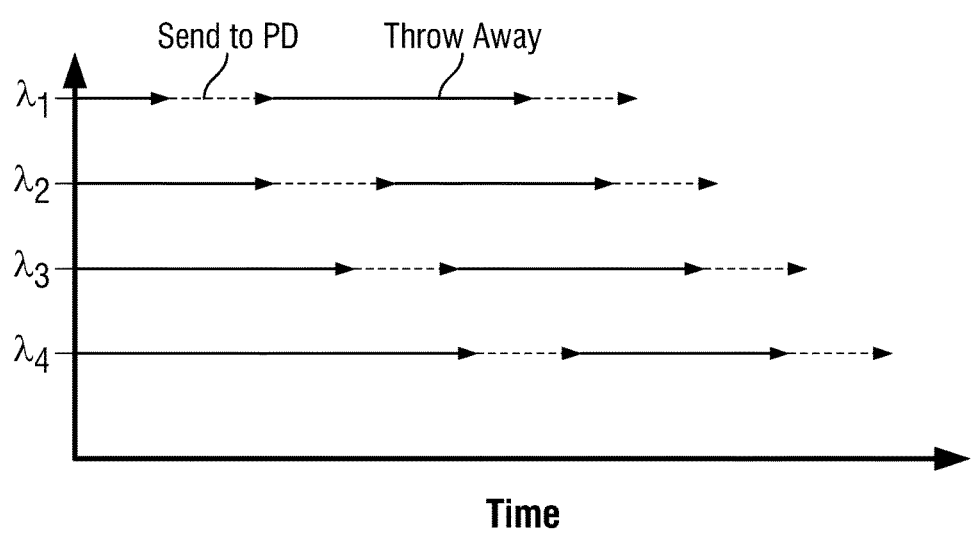
FIG. 3 illustrates one example of a sequence that may be used to route the wavelength components X1, X2, X3 and X4 of an WDM optical signal through the WSS between its input and output ports.

Individual wavelength components being routed through the WSS may be monitored by the photodetector 135 in a wide variety of different ways. FIG. 3 illustrates one example of a sequence that may be used in connection with the WSS 100 of FIG. 1. In particular, FIG. 3 shows, as a function of time, the wavelength components X1, X2, X3 and X4 of an WDM optical signal which are routed through the WSS between its input and output ports.

In FIG. 3 the horizontal lines terminating in arrows each represent a period of time during which the corresponding wavelength component is routed through the WSS with a selected amount of attenuation. Solid lines represent a period of time during which the rejected light for the corresponding wavelength is simply lost. That is, solid lines represent a period of time during which the corresponding wavelength components are not being monitored because the rejected light is not being directed to the photodetector 135. On the other hand, dashed lines represent a period of time during which the corresponding wavelength components are being monitored because the rejected light is being directed to the photodetector 135.

As FIG. 3 shows, the rejected light from the different wavelength components is sequentially routed to the photodetector so that various wavelength components can be monitored on a periodic basic. As also shown, in this particular implementation the amount of time during which a given wavelength component is being monitored is much less than the amount of time during which it is not being monitored. In this way the system is better able to monitor all of the wavelength components being routed through the WSS. Of course, the ratio of the time spent monitoring and not monitoring a given wavelength component may vary from application to application. Moreover, in various implementations the amount of time during which a wavelength component is being monitored may differ from wavelength component to wavelength component and may change over time for one or more of the wavelength components.

For many applications it may be cost prohibitive to dedicate multiple ports which are equipped with a photodetector for simultaneously monitoring wavelength components. Thus, one advantage of the device shown herein is that a single port, equipped with a single photodetector, can be used to monitor multiple wavelength components.

Illustrative Wavelength Selective Switch

One example of a wavelength selective switch in which an optical channel monitor of the type described above may be incorporated will be described with reference to FIGS. 4-5. Additional details concerning this optical switch may be found in co-pending U.S. application Ser. No. 14/220,639 entitled "Wavelength Selective Switch Employing a LCoS Device and Having Reduced Crosstalk," which is hereby incorporated by reference in its entirety.

FIGS. 4A and 4B are top and side views respectively of one example of a simplified optical device such as a free-space WSS 100 that may be used in conjunction with embodiments of the present invention. Light is input and output to the WSS 100 through optical waveguides such as optical fibers which serve as input and output ports. As best seen in FIG. 1B, a fiber collimator array 101 may comprise a plurality of individual fibers 1201, 1202 and 1203 respectively coupled to collimators 1021, 1022 and 1023. Light from one or more of the fibers 120 is converted to a free-space beam by the collimators 102. The light exiting from port array 101 is parallel to the z-axis. While the port array 101 only shows three optical fiber/collimator pairs in FIG. 1B, more generally any suitable number of optical fiber/collimator pairs may be employed.

A pair of telescopes or optical beam expanders magnifies the free space light beams from the port array 101. A first telescope or beam expander is formed from optical elements 106 and 107 and a second telescope or beam expander is formed from optical elements 104 and 105.

In FIGS. 4A and 4B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 4A and 4B the optical elements 102, 108, 109 and 110 are depicted with solid lines in both figures. On the other hand, optical elements 106 and 107 are depicted with solid lines in FIG. 4A (since they have focusing power along the y-axis) and with dashed lines in FIG. 4B (since they leave the beams unaffected along the x-axis). Optical elements 104 and 105 are depicted with solid lines in FIG. 4B (since they have focusing power along the x-axis) and with dashed lines in FIG. 4A (since they leave the beams unaffected in the y-axis).

Each telescope may be created with different magnification factors for the x and y directions. For instance, the magnification of the telescope formed from optical elements 104 and 105, which magnifies the light in the x-direction, may be less than the magnification of the telescope formed from optical elements 106 and 107, which magnifies the light in the y-direction.

The pair of telescopes magnifies the light beams from the port array 101 and optically couples them to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The light from the dispersion element is directed to beam focusing optics 109.

Beam focusing optics 109 couple the wavelength components from the wavelength dispersion element 108 to a optical path conversion system. In this example the optical path conversion system is a programmable optical phase modulator, which may be, for example, a liquid crystal-based phase modulator such as a LCoS device 110. The wavelength components are dispersed along the x-axis, which is referred to as the wavelength dispersion direction or axis. Accordingly, each wavelength component of a given wavelength is focused on an array of pixels extending in the y-direction.

As best seen in FIG. 4B, after reflection from the LCoS device 110, each wavelength component can be coupled back through the beam focusing optics 109, wavelength dispersion element 108 and optical elements 106 and 107 to a selected fiber in the port array 101. As discussed in more detail in the aforementioned co-pending U.S. Application, appropriate manipulation of the pixels in the y-axis allows selective independent steering of each wavelength component to a selected output fiber.

In one particular embodiment, the LCoS 110 is tilted about the x-axis so that it is no longer in the x-y plane and thus is no longer orthogonal to the z-axis along which the light propagates from the port array 101. Stated differently, a skewed angle is formed between the z-axis and a direction in the plane of the modulator perpendicular to the wavelength dispersion axis. Such an embodiment is shown in FIG. 5, which is a side-view similar to the side-view shown in FIG. 4B. In FIG. 5 and FIGS. 4A and 4B, like elements are denoted by like reference numerals. By tilting the LOCS 110 in this manner crosstalk arises from scattered light can be reduced.

Figure 5:
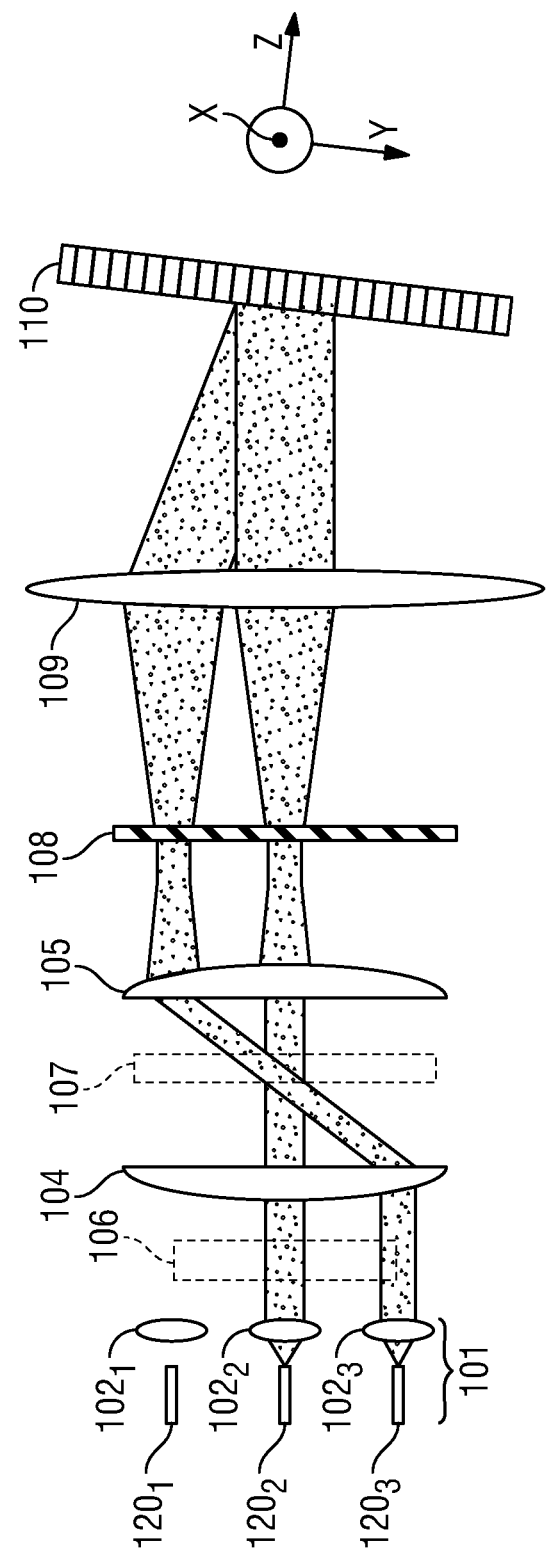
FIG. 5 is a side view of an alternative example of a simplified optical device such as a free-space switch that may be used in conjunction with embodiments of the present invention.

While the optical path conversion system employed in the particular wavelength selective switch shown in FIGS. 4-5 is based on a programmable optical phase modulator (e.g., a LCoS device), more generally other technologies may be employed instead, including, for instance, MEMs-based devices such as DMDs.

The controller 150 shown in FIG. 1 may be implemented in hardware, software, firmware or any combination thereof. For example, the controller may employ one or more processors, digital signal processors (DSPs), application specific integrated circuits (ASICs), field programmable gate arrays (FPGAs), discrete logic, or any combinations thereof. When the controller is implemented partially in software, a device may store computer-executable instructions for the software in a suitable, non-transitory computer-readable storage medium and may execute the instructions in hardware using one or more processors to perform the techniques of this disclosure.

The invention claimed is:

1. A method of monitoring a first optical wavelength component of a WDM optical signal being routed through a wavelength selective switch (WSS) having a switching fabric that includes a spatial light modulator (SLM), comprising:
    directing the first optical wavelength component from a given input port of the WSS to a selected output port with a selected amount of attenuation when a first portion of the SLM is periodically configured to produce a first phase pattern so that a rejected portion of the first optical wavelength component giving rise to the selected amount of attenuation is directed to an optical monitor associated with another output port of the WSS when the first portion of the SLM is periodically configured to produce the first phase pattern; and
    determining a power level of the first optical wavelength component directed from the given input port to the selected output port by (i) measuring the rejected portion of the first optical wavelength component received by the optical monitor and (ii) calibrating the measured power level of the rejected portion using pre-calibrated data, the pre-calibrated data specifying a ratio between a measured power level of the first optical wavelength component received at the selected output port relative to a measured power level of the first optical wavelength component received by the given input port and a measured power level of the rejected portion that is directed to the optical monitor when the first portion of the SLM is configured to produce the first phase pattern.

2. The method of claim 1, further comprising selecting the first phase pattern from among a plurality of phase patterns that each directs the first optical wavelength component from the given input port of the WSS to the selected output port and gives rise to the selected amount of attenuation.

3. The method of claim 2 further comprising:
    directing a second optical wavelength component from the given input port of the WSS to a second selected output port with a second selected amount of attenuation when a second portion of the SLM is periodically configured to produce a second phase pattern and the first portion of the SLM is periodically configured to produce the first phase pattern so that a rejected portion of the second optical wavelength component giving rise to the second selected amount of attenuation is directed away from the optical monitor and the rejected portion of the first optical wavelength component is directed to the optical monitor.

4. The method of claim 3 further comprising:
    directing the second optical wavelength component from the given input port of the WSS to the second selected output port with a second selected amount of attenuation when the second portion of the SLM is periodically configured to produce a third phase pattern so that a rejected portion of the second optical wavelength components that gives rise to the second selected amount of attenuation is directed to the optical monitor, and, while the second portion of the SLM is periodically configured with the third pattern, configuring the first portion of the SLM to produce a fourth phase pattern selected from the first plurality of patterns so that the rejected portion of the first optical wavelength component giving rise to the first selected amount of attenuation is directed away from the optical monitor; and
    determining a power level of the second optical wavelength component directed from the given input port to the second selected output port using the pre-calibrated data.

5. The method of claim 4 further comprising directing the first wavelength component to the first portion of the SLM while alternating the configuration of the first portion of the SLM between the first and fourth phase patterns.

6. The method of claim 5 wherein a duration of time during which the first portion of the SLM is configured with the first phase pattern is less than a duration of time during which the first portion of the SLM is configured with the fourth phase pattern.

7. The method of claim 1 wherein the SLM is a liquid crystal on silicon (LCoS) device.

8. The method of claim 1 wherein the SLM is a microelectromechanical mirror array.

9. An optical device, comprising:
    an optical port array having at least one optical input port for receiving an optical beam and a plurality of optical output ports;
    a photodetector optically coupled to a first of the optical output ports;
    a dispersion element receiving the optical beam from the at least one optical input port and spatially separating the optical beam into a plurality of wavelength components;

a focusing element for focusing the plurality of wavelength components;

a programmable optical phase modulator for receiving the focused plurality of wavelength components, the modulator being configured to steer the wavelength components to a selected one of the optical output ports; one or more processors;

a non-transitory computer-readable storage medium comprising instructions that, when executed, control the one or more processors to be configured for:

causing a first portion of the programmable optical phase modulator to be periodically configured to produce a first phase pattern while a first optical wavelength component is directed from a given input port of the WSS to a selected output port with a selected amount of attenuation so that a rejected portion of the first optical wavelength component giving rise to the selected amount of attenuation is directed to an optical monitor associated with another output port of the WSS when the first portion of the programmable optical phase modulator is periodically configured to produce the first phase pattern; and causing a power level of the first optical wavelength component directed from the given input port to the selected output port to be determined by (i) measuring the rejected portion of the first optical wavelength component received by the optical monitor and (ii) calibrating the measured power level of the rejected portion using pre-calibrated data, the pre-calibrated data specifying a ratio between a measured power level of the first optical wavelength component received at the selected output port relative to a measured power level of the first optical wavelength component received by the given input port and a measured power level of the rejected portion that is directed to the optical monitor when the first portion of the programmable optical phase modulator is configured to produce the first phase pattern.

10. The optical device of claim 9, wherein the programmable optical phase modulator includes a liquid crystal-based phase modulator.

11. The optical device of claim 10, wherein the liquid crystal-based phase modulator is a LCoS device.

12. The optical device of claim 9, wherein the dispersive element is selected from the group consisting of a diffraction grating and a prism.

13. The optical device of claim 9, further comprising an optical system for magnifying the optical beam received from the optical port array and directing the magnified optical beam to the dispersion element.

14. The optical device of claim 13, wherein the optical system has a first magnification factor in a first direction and a second magnification factor in a second direction orthogonal to the first direction, the first magnification factor being different from the second magnification factor.

15. The optical device of claim 14, wherein the first direction is parallel to a wavelength dispersion axis along which the optical beam is spatially separated, the first magnification factor being less than the second magnification factor.

* * * * *